US007648195B2

(12) United States Patent
Stock-Hausen-Petersen et al.

(10) Patent No.: US 7,648,195 B2
(45) Date of Patent: Jan. 19, 2010

(54) MOTOR VEHICLE BODY WHOSE UNDERBODY AREA IS ASSOCIATED WITH REINFORCING STRUTS

(75) Inventors: Helmut Von Stock-Hausen-Petersen, Hörstel-Riesenbeck (DE); Sven Volkhausen, Bünde (DE)

(73) Assignee: Wilhelm Karmann GmbH, Osnabrueck ( * ) Notice: Subject to any disclaimer, the term of this patent is extended or adjusted under 35 U.S.C. 154(b) by 85 days.

(21) Appl. No.: 10/596,941

(22) PCT Filed: Dec. 16, 2004

(86) PCT No.: PCT/DE2004/002771

§ 371 (c)(1),
(2), (4) Date: Oct. 12, 2006

(87) PCT Pub. No.: WO2005/066011

PCT Pub. Date: Jul. 21, 2005

(65) Prior Publication Data

US 2007/0267895 A1    Nov. 22, 2007

(30) Foreign Application Priority Data

Jan. 2, 2004    (DE) .................... 10 2004 001 060

(51) Int. Cl.
*B62D 25/10* (2006.01)
(52) U.S. Cl. ........................................ 296/204
(58) Field of Classification Search ............ 296/193.07, 296/30, 204, 197.08, 187.08; 180/311; 280/781, 280/784
See application file for complete search history.

(56) References Cited

FOREIGN PATENT DOCUMENTS

| EP | 0 955 228 A2 | 11/1999 |
| EP | 1 147 970 A2 | 10/2001 |
| EP | 1 225 119 A2 | 7/2002 |

*Primary Examiner*—Joseph D Pape
(74) *Attorney, Agent, or Firm*—Quinn Law Group, PLLC

(57) ABSTRACT

A motor vehicle, especially a convertible vehicle, with a vehicle body in whose underbody area reinforcing struts re provided. At least one retaining bridge is arranged indirectly or directly on the underbody and extending beneath part of an exhaust system for attachment of at least one of the struts.

10 Claims, 6 Drawing Sheets

MOTOR VEHICLE BODY WHOSE UNDERBODY AREA IS ASSOCIATED WITH REINFORCING STRUTS

CROSS-REFERENCE TO RELATED APPLICATION(S)

This application is a US National Phase of International Application No. PCT/DE 2004/002771, filed Dec. 16, 2004, which claims priority to German 10 2004 001 060.9, filed Jan. 2, 2004. The entire contents of the above identified applications are incorporated herein by reference.

TECHNICAL FIELD

The invention relates to a motor vehicle, especially a convertible vehicle with struts connected to its underbody according to the main concept of Claim 1.

BACKGROUND OF THE INVENTION

There is a general problem in motor vehicles that external excitations that occur during driving, for example, when driving over potholes or bumps, can trigger undesired vibrations and torsional flexing of the auto body. Driving safety and comfort can be compromised and the vehicle structure stressed as a result. This problem occurs to a particular degree in convertible vehicles with a self-supporting auto body, which, because of the non-rigid roof (which cannot reinforce the auto body when open), have a stability disadvantage compared to closed vehicle structures. In principle, however, this is true in all vehicles.

It is known to provide separate reinforcing struts to the auto body in the underbody area, one strut pair of which extends from external edge areas in the transverse direction of the vehicle in front of the rear wheel wells to an area lying farther inside in the vicinity of a vertical vehicle longitudinal center plane behind the rear wheel wells and can be attached there to a spare-tire well. However, spare tires are increasingly being dispensed with and only a tire sealant carried along instead. It is often desirable, especially in sports cars, to arrange essential parts of an exhaust system in the middle area, in order to be able to provide a central exhaust unit, especially a multiflow unit. However, the previous possibility of strut attachment on the underbody is difficult or even impossible in such vehicles.

SUMMARY OF THE INVENTION

The problem underlying the invention is to expand the possibilities of strut attachment to the auto body in a motor vehicle.

The invention solves this problem by a vehicle with the features of Claim 1. Advantageous embodiments of the object of the invention can be seen from the additional Claims 2 through 10.

Due to the fact that at least one retaining bridge extending beneath part of an exhaust system is provided in the underbody area of the vehicle, struts can be attached to it even beneath areas that are not suitable per se to accommodate attachment devices. A center exhaust system can therefore be provided without interfering with the optimal geometry of the arrangement of the reinforcing struts on this account.

For example, the retaining bridge can extend beneath an end muffler arranged essentially in a middle of the transverse cross-section of the vehicle, so that this can also be arranged without additional expense for redesign at the usual spacing from the exhaust pipe.

If the retaining bridge lies with a vertical spacing of several centimeters beneath the undercut part of the exhaust system, struts attached there can run horizontally and lie directly against the underbody with their front end areas facing away from the retaining bridge.

It is also possible with the retaining bridge that struts are designed to be vibration-selective and a sensing unit to record longitudinal stresses occurring during driving and at least one control element to cause a force that counteracts the longitudinal stress are assigned to them so that active stabilization of the vehicle is possible with respect to the external vibration excitation.

Additional advantages of features of the invention can be seen from the embodiment example of the object of the invention shown in the drawing and described below.

DESCRIPTION OF THE PREFERRED EMBODIMENTS

Figure 1:
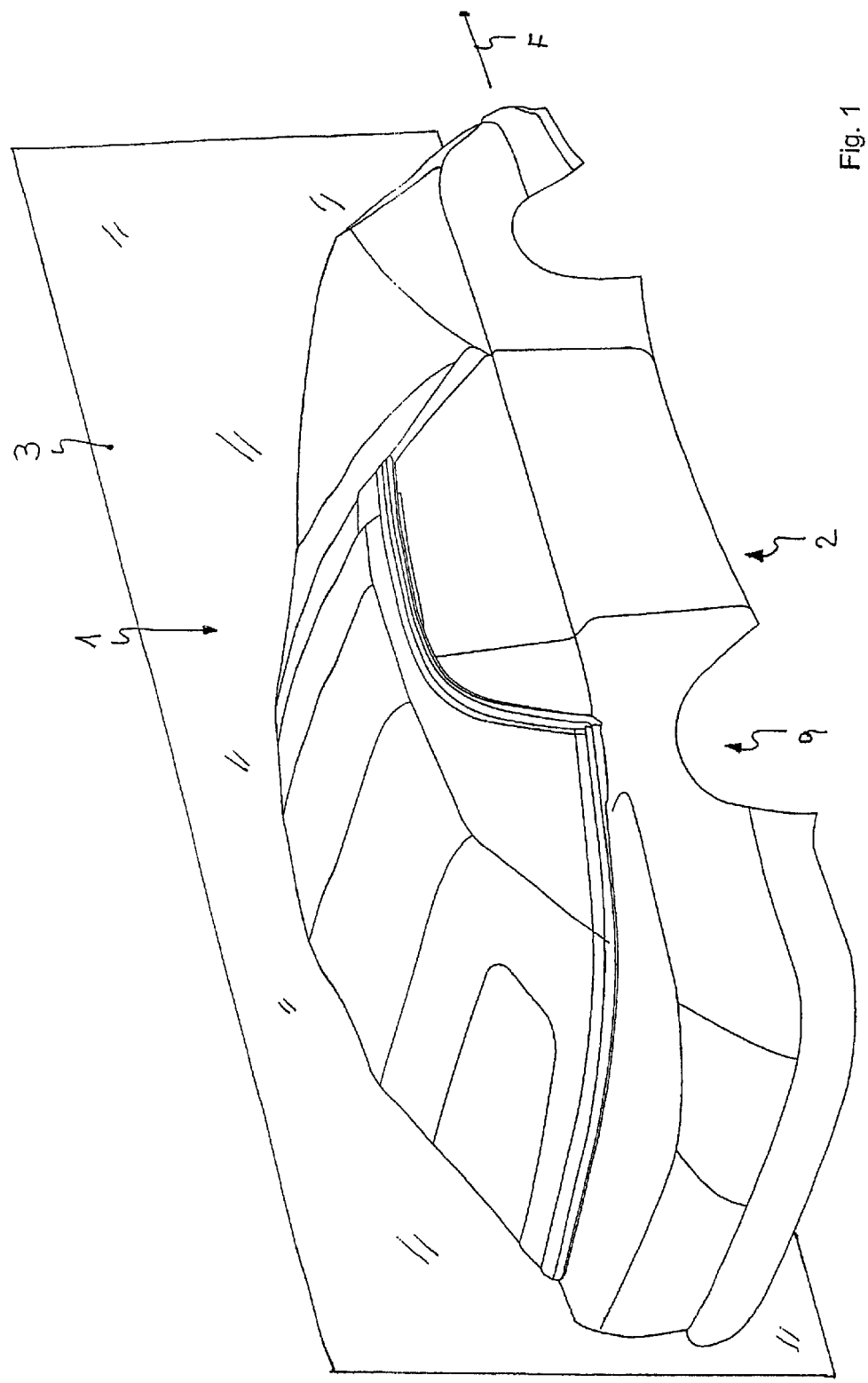
FIG. 1 shows a schematic perspective view of a motor vehicle according to the invention, shown broken down in its vertical longitudinal center plane.
Figure 2:
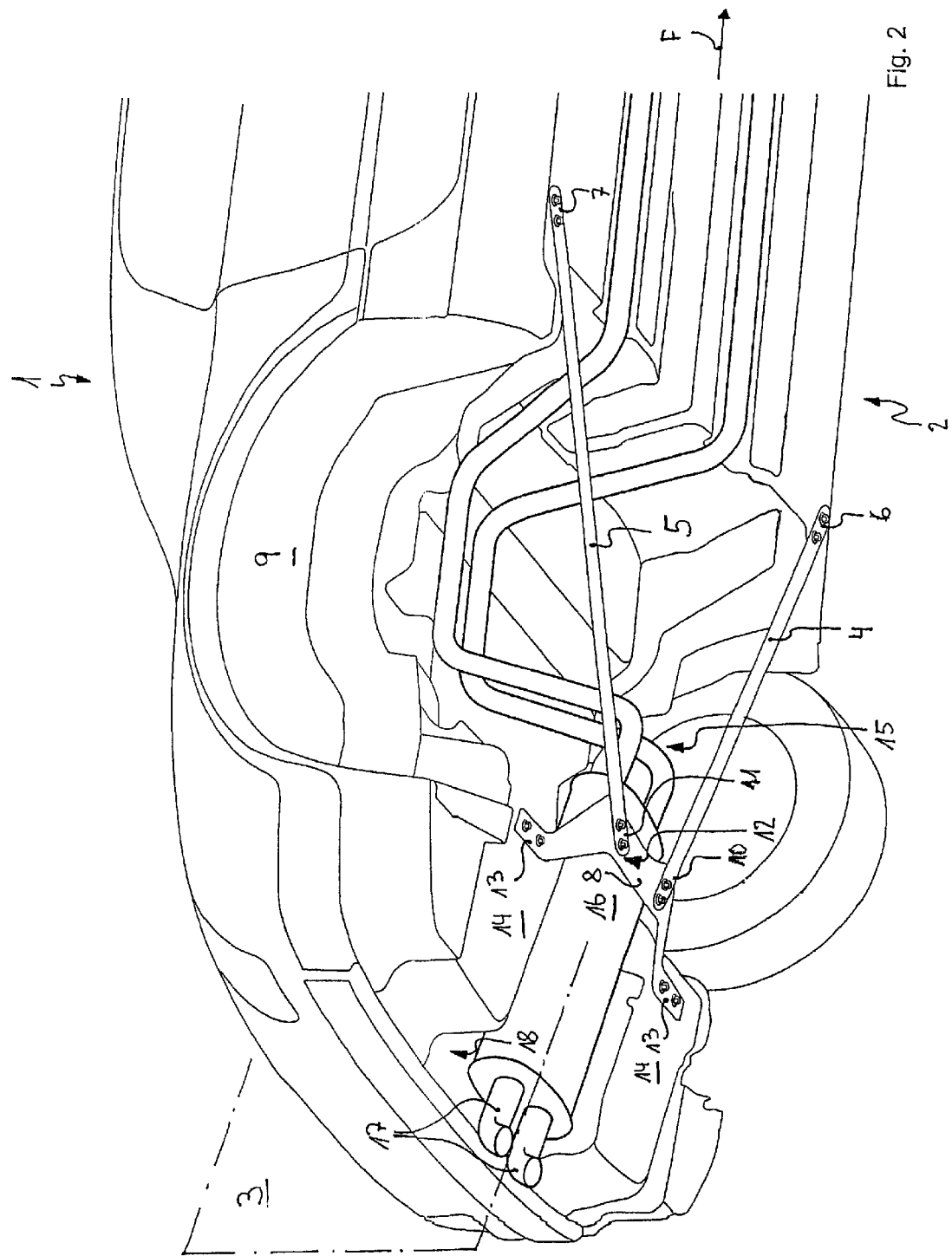
FIG. 2 shows a schematic view of the underbody of the vehicle according to FIG. 1 with at least two reinforcing struts in the rear area attached to a common retaining bridge.

In the drawn embodiment example according to FIG. 2, a pair of reinforcing struts 4, 5 lying symmetrically to a vertical longitudinal center plane 3 is provided at least in the rear area of the underbody 2 of vehicle 1—here a convertible vehicle, which is not essential. In addition, further struts can lie in the front area of the vehicle. The number and symmetric arrangement of the struts 4, 5 shown here is to be understood only as an example, as is their route.

The struts 4, 5 here are each attached with their front end 6, 7 in the travel direction F directly to the underbody 2 of vehicle 1 in its outer transverse edge area. In the present embodiment example, they are detachably screwed to the underbody 2, for which purpose separate abutments, each provided with an internal thread (not shown), are provided above the underbody 2. Riveting or welding can also be considered.

The struts 4, 5 extend in their route from their front end 6, 7 in front of the rear wheel wells 9 to the rear ends 10, 11, which lie behind wheel wells 9 with respect to the travel direction F, on the vertical longitudinal center plane 3. The struts 4, 5 can each be designed with profiles, for example, tubular or box profiles made of metal, or perhaps also fiber-reinforced plastic. In the embodiment example, tubes with an elliptical cross-section are used, which only vibrate slightly. When larger vibrations must be accommodated, the use of flat iron is also possible. The ends 6, 7, 10, 11 can also be pressed together flat in profile struts 4, 5 in order to simplify passage of the attachment devices. The shape of the struts 4, 5 can deviate significantly from the linear struts shown here. Angled and/or flat components can also be considered as struts.

Figure 3:
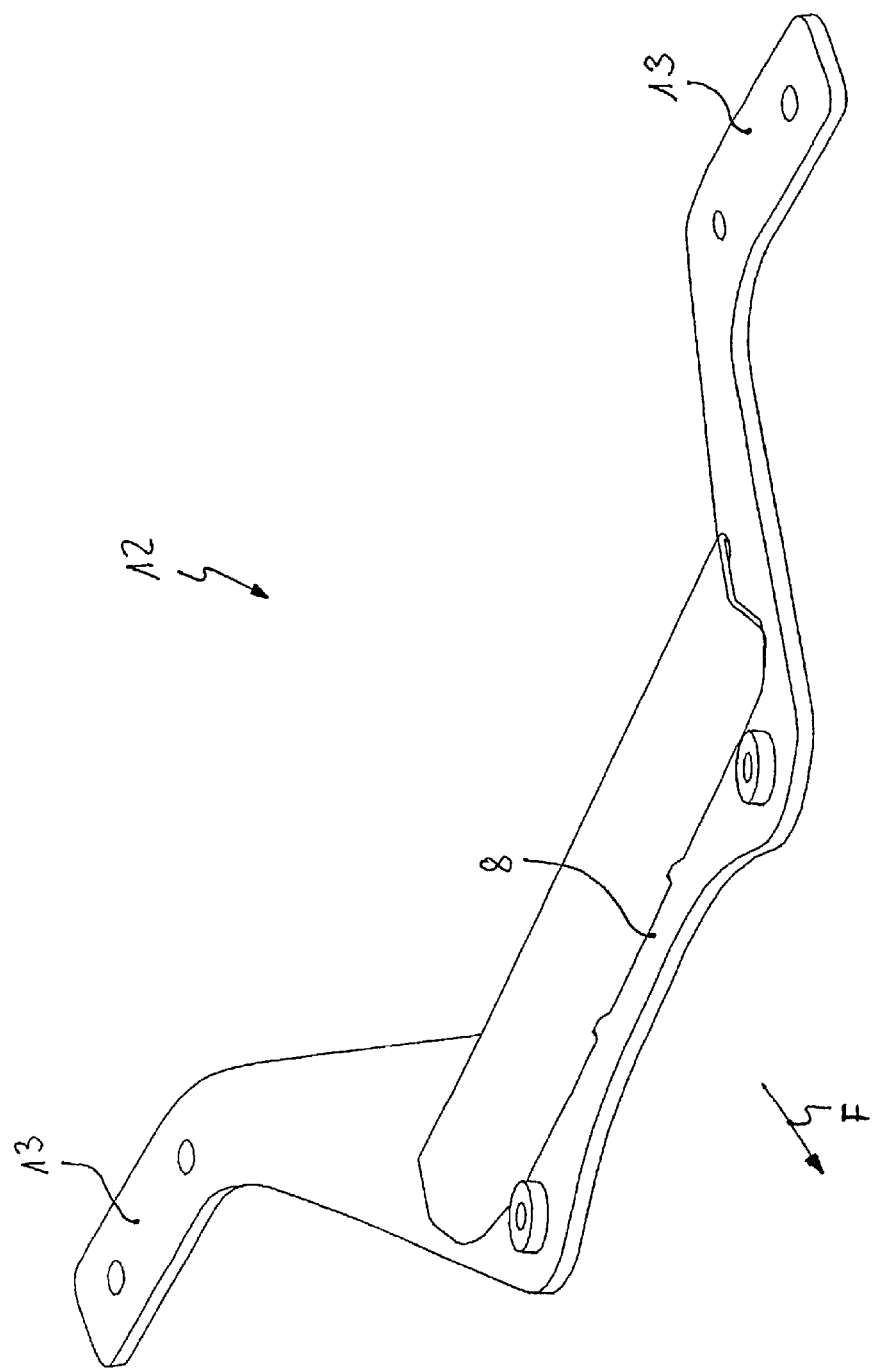
FIG. 3 shows a detailed partial view of the retaining bridge mounted in FIG. 2.
Figure 4:
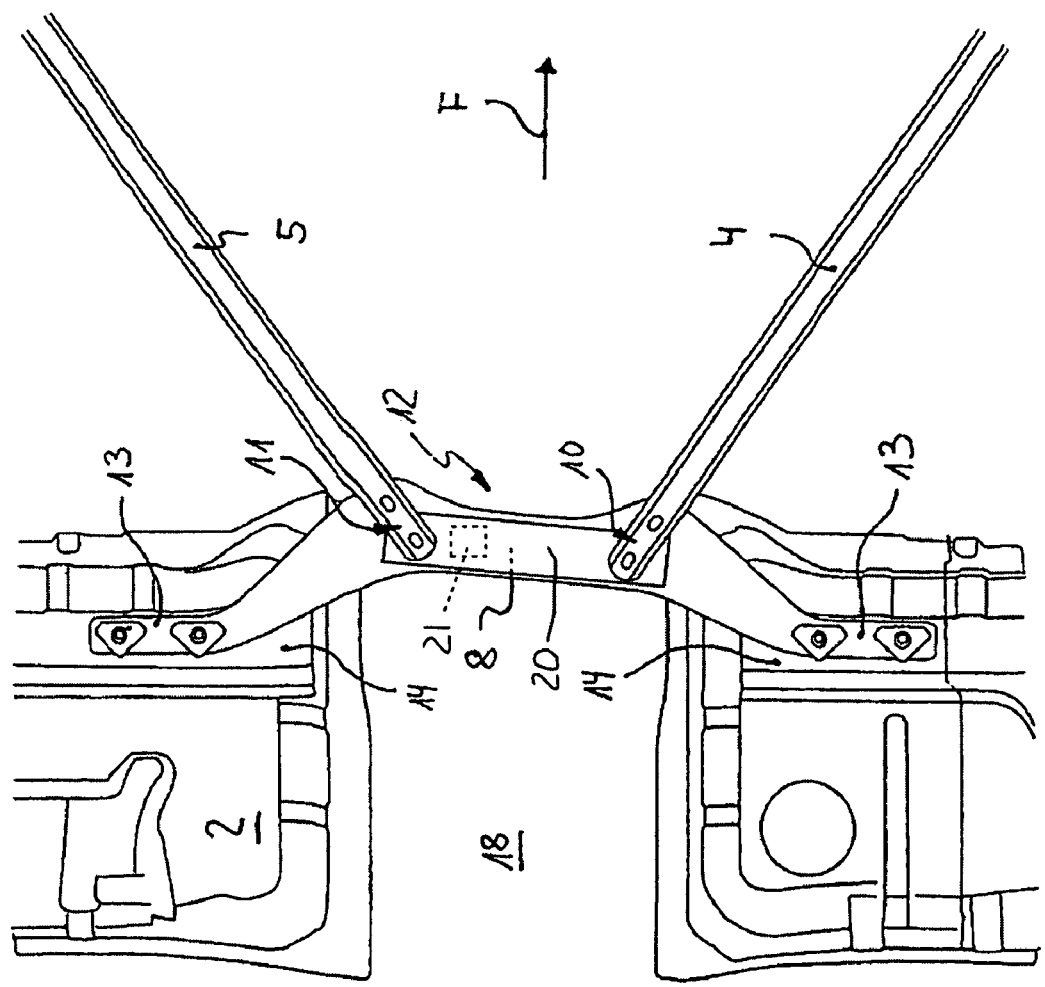
FIG. 4 shows a detailed view from the bottom of the mounted retaining bridge with struts attached to it, with the exhaust system not shown.
Figure 6:
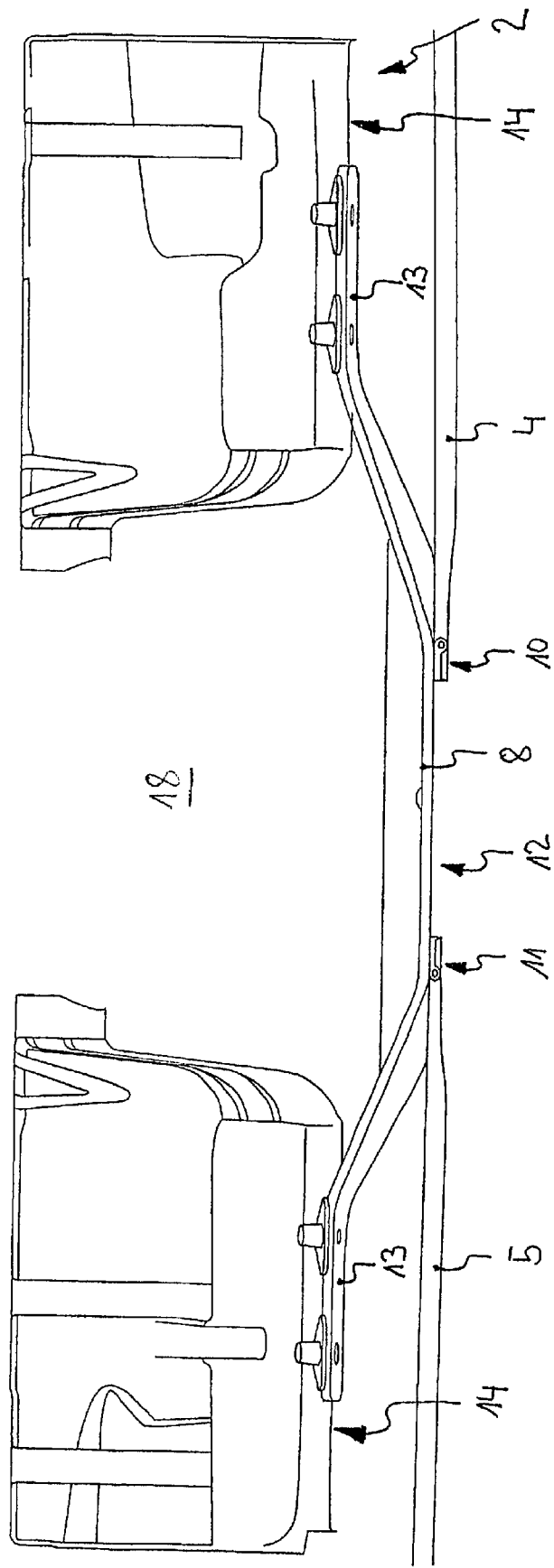
FIG. 6 shows a view of the retaining bridge with the struts attached to it from the front.

The rear ends 10, 11 of the struts 4, 5 are attached here to a common retaining bridge 12, which is designed to be essentially trapezoidal (FIG. 3, FIG. 6), with at least one or (as in the case here) two attachment flanges 13 that engage on the sides. Two individual retaining bridges lying one beyond the other for each of the struts 4, 5 (not shown) are also possible. The retaining bridge or each retaining bridge 12 can be formed from an angled flat iron. It includes here an additional reinforcement in the center area 8 to improve stability. The retaining bridge 12 is attached (here screwed) with the side attachment flanges 13 to essentially horizontal surfaces 14 of the underbody 2. Depending on the design, attachment of a retaining bridge by only one attachment flange 13 is also possible. In the embodiment example, in the view from below (FIG. 4), the attachment flange 13 lies behind the middle area 8 of the retaining bridge 12, so that an almost X-shaped overall route (therefore particularly favorable for torsional rigidity of the vehicle 1) is formed by it with the struts 4, 5.

Figure 5:
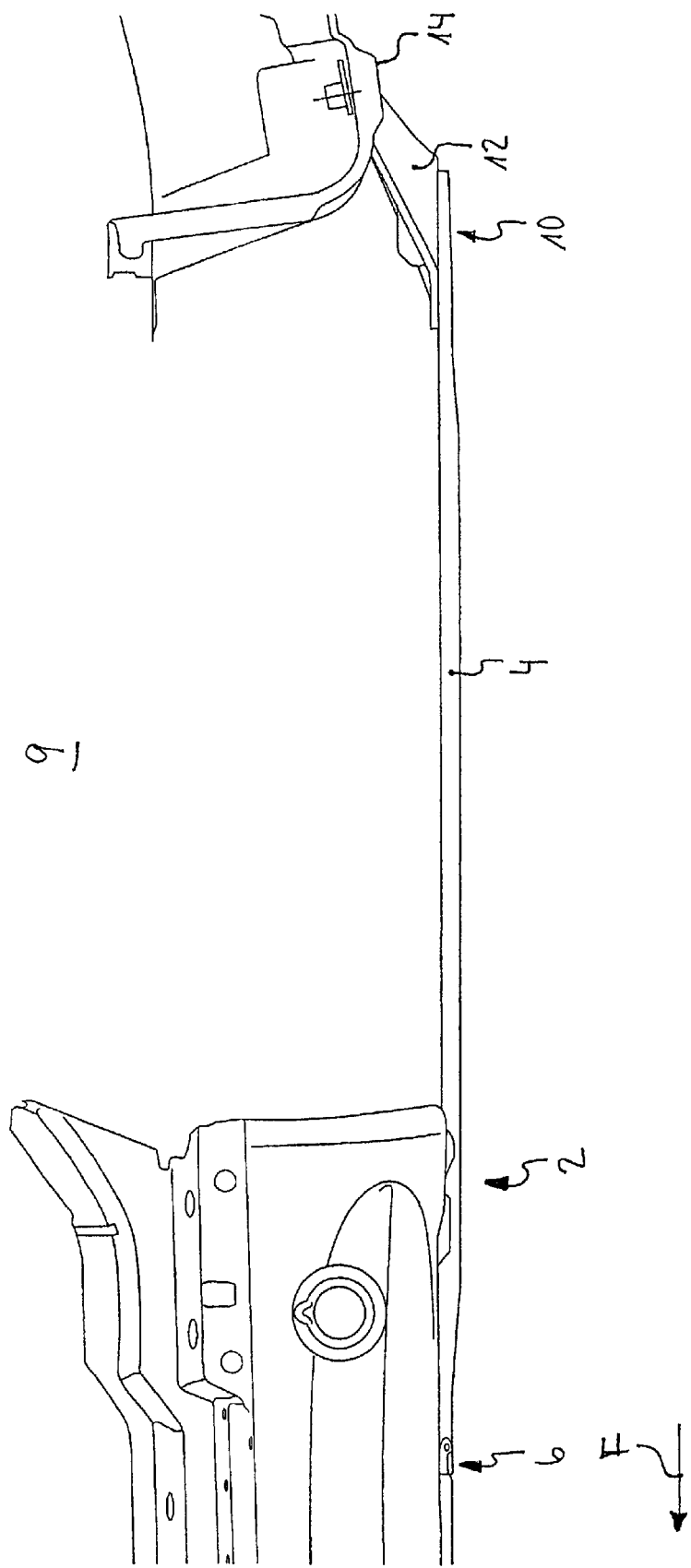
FIG. 5 shows a side view of the struts mounted, at one end, on the retaining bridge and, at the other end, on the underbody of the vehicle.

In each case, the retaining bridge 12 extends beneath part of an exhaust system 15, here an end muffler 16, which is arranged in front of two exhaust pipes 17. The end muffler is arranged in a channel 18 extending upward in the underbody 2 and can lie essentially in the transverse center of the vehicle. The retaining bridge 12 can extend with its middle area several centimeters beneath the end muffler 16 and therefore also permit (in relatively high attachment surfaces 14) a horizontal route of the struts 4, 5 from their rear ends 10, 11 to their front ends 6, 7 (FIG. 5). Work on parts of the exhaust system 15 can be possible without disassembly of the retaining bridge 12. The struts 4, 5 can be screwed or attached to the retaining bridge 12 in some other way. Screwing permits simple loosening and reattachment of the struts 4, 5 for possible repair and especially replacement requirements, for example, of the end muffler 16 with the exhaust pipe attached to it.

The struts 4, 5 of the auto body can serve not only as ordinary reinforcement components, but also (not shown) as adaptive vibration dampers, i.e., in addition to the passive reinforcement function, they can also permit the vibration behavior of the auto body to be influenced actively.

For this purpose, the struts 4, 5 can be designed in several parts and can both detect a length change of the struts 4, 5, for example, by piezocrystals, and counteract it actively with a short response time. The struts 4, 5 can also be secured together to a support device, which in turn is mounted so as to be movable on retaining bridge 12 and include, for example, a transverse control arm designed as a balance beam that can be pivoted about an at least almost vertical axis with respect to the retaining bridge 12.

The support device can be influenced in its pivoting movement about the vertical axis by a control element, often also referred to as an actuator, which can be connected at one end to the retaining bridge 12 and at the other end to the balance beam of the support device eccentrically and with a spacing from its axis. The strut ends 10, 11 can then be coupled to the outer ends of the balance beam.

A sensing unit, which detects torsional flexing of the auto body during excitation of an external vibration, for example, when passing over a pothole or bump, since a tensile or compressive force is introduced to at least one of the struts 4, 5 relative to the other one through its end 6, 7 attached to the auto body, serves to drive the actuator and therefore deflect the balance beam from its normal position. The opposite end 10, 11 attempts on this account to carry the balance beam accordingly and deflect it about its axis.

This deflection tendency is recorded by the sensing unit, which contains a pressure-voltage converter, and converted to an electrical signal for the actuator, which counteracts the torque on the support device introduced by the external force. Because of this deflection, the two struts 4, 5 are exposed to compression and tension in counter-phase to each other. Both struts 4, 5 simultaneously reinforce the auto body on this account and cause active damping. The effect of the external excitation is therefore almost extinguished. The control element and the sensing unit have very short response times, so excitation frequencies of a few Hz to a few tens of Hz can be effectively counteracted.

While the best modes for carrying out the invention have been described in detail, those familiar with the art to which this invention relates will recognize various alternative designs and embodiments for practicing the invention within the scope of the appended claims.

The invention claimed is:

1. A motor vehicle (1) with a vehicle body in whose underbody area (2) two reinforcing struts (4, 5) are provided, each extending to a respective end (10, 11), wherein the two reinforcing struts (4, 5) are fixed to the vehicle body by the respective ends (10, 11), characterized by at least one retaining bridge (12) arranged indirectly or directly on the underbody (2) and extending beneath part of an exhaust system (15) for attachment of at least one of the struts (4, 5);
   wherein the at least one retaining bridge (12) includes a center area (8) configured for holding the two reinforcing struts (4, 5);
   wherein the retaining bridge (12) is positioned behind rear wheel wells (9) with respect to the direction of travel (F); and
   at least one side attachment flange (13) positioned behind the center area (8), with respect to the direction of travel (F), such that the at least one side attachment flange (13) is attached to the underbody (2).

2. A motor vehicle (1) according to claim 1, characterized in that the retaining bridge (12) passes beneath an end muffler (16) arranged essentially in the transverse center of the vehicle.

3. A motor vehicle (1) according to claim 1, characterized in that rear end areas (10, 11) of the two struts (4, 5) can be attached to the retaining bridge (12), which extend from there with one component in the direction of travel (F) and are attached at their front ends (6, 7) to the auto body.

4. A motor vehicle (1) according to claim 1, characterized in that the retaining bridge (12) lies at a vertical spacing several centimeters beneath said part of the exhaust system (15).

5. A motor vehicle (1) according to claim 1, characterized in that the two struts (4, 5) can be attached to the retaining bridge (12) by screw connections.

6. A motor vehicle (1) according to claim 1, characterized in that the retaining bridge (12) can be attached to the auto body by screw connections.

7. A motor vehicle (1) according to claim 1, characterized in that the underbody (2) has a channel (18) extending upward in the underbody (2) for the exhaust system (15) and surfaces (14) of the auto body lying deeper with respect to it on both sides as attachment surfaces for the retaining bridge (12).

8. A motor vehicle (1) according to claim 1, wherein the at least one attachment flange (13) is a pair of attachment flanges (13) that extend from opposing ends of the center area (8) in opposing directions.

9. A motor vehicle (1) according to claim 8, wherein each of the attachment flanges (13) extend from the opposing ends of the center area (8) in a curved fashion such that the retaining bridge (12) is generally trapezoidal.

10. A motor vehicle (1) according to claim 1, wherein the retaining bridge (12) includes two securing flanges (13) and, from these, together with the two struts (4, 5), an almost x-shaped shape.

* * * * *